United States Patent [19]

Gershman

[11] Patent Number: 4,976,220
[45] Date of Patent: * Dec. 11, 1990

[54] SPLASH-FREE CONTROLLED ACCESS WATER SUPPLY APPARATUS FOR ANIMALS

[76] Inventor: Lennie Gershman, 10853 Rose Ave., #55, Los Angeles, Calif. 90034

[*] Notice: The portion of the term of this patent subsequent to Jul. 4, 2006 has been disclaimed.

[21] Appl. No.: 374,962

[22] Filed: Sep. 11, 1989

Related U.S. Application Data

[63] Continuation-in-part of Ser. No. 171,786, Mar. 22, 1988, Pat. No. 4,844,014.

[51] Int. Cl.⁵ .............................................. A01K 31/00
[52] U.S. Cl. ....................................................... 119/18
[58] Field of Search ................. 119/18, 72, 77, 51.01, 119/51.03, 51.5; 222/414, 410, 368, 377, 181, 185

[56] References Cited

U.S. PATENT DOCUMENTS

| | | | |
|---|---|---|---|
| 404,696 | 6/1889 | Fee et al. | 222/368 |
| 998,000 | 7/1911 | Hermann et al. | 222/368 |
| 1,158,676 | 11/1915 | Furber | 119/77 |
| 1,326,778 | 12/1919 | Paulsen | 119/73 |
| 2,618,327 | 11/1952 | McDermott et al. | 119/72 |
| 2,699,752 | 1/1955 | Reyes | 119/18 |
| 3,730,141 | 5/1973 | Manning et al. | 119/77 X |
| 3,771,496 | 11/1973 | Atchley | 119/75 |
| 3,866,576 | 2/1975 | Downing | 119/18 |
| 3,946,701 | 3/1976 | Hostetler | 119/18 |
| 4,034,715 | 7/1977 | Arner | 119/77 X |
| 4,158,427 | 6/1979 | Hegge | 222/368 |
| 4,559,905 | 12/1985 | Ahrens | 119/72 |
| 4,721,063 | 1/1988 | Atchley | 119/61 X |
| 4,840,143 | 6/1989 | Simon | 119/72 X |
| 4,844,014 | 7/1989 | Gershman | 119/18 |

FOREIGN PATENT DOCUMENTS 829246 12/1951 Fed. Rep. of Germany .... 119/51 R

*Primary Examiner*—Gene Mancene
*Assistant Examiner*—R. Thomas Price
*Attorney, Agent, or Firm*—Poms, Smith, Lande & Rose

[57] ABSTRACT

A water supply apparatus for animals and small pets is provided which allows limited access for selective delivery of discrete amounts of water from a reservoir within the water supply apparatus to an outside trough region wherefrom the animal may drink. The means for transferring the water from the reservoir to the trough may include a paddle wheel having a plurality of fins. The paddle wheel is rotatably mounted about a spindle that is supported across a rectangular slot which connects the trough with the reservoir. Upon pushing the paddle wheel, the pet or animal draws water from the reservoir to the outer trough from which it may drink. The reservoir may extend to a tank located at an elevation substantially above that of the paddle wheel, and the unit may have a flat back for mounting against a wall, and may have a support hook or bracket for securing the water supply in place.

13 Claims, 2 Drawing Sheets

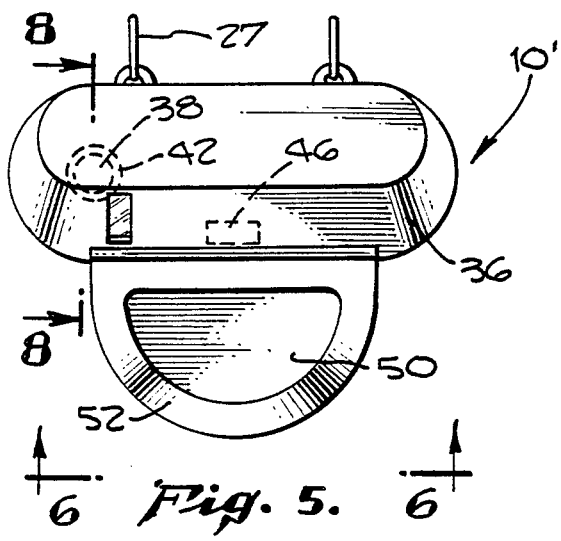
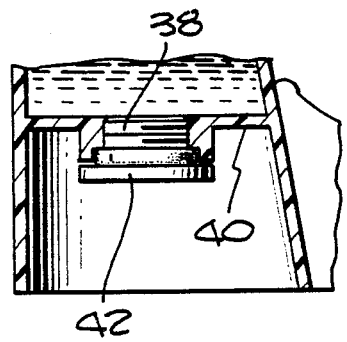
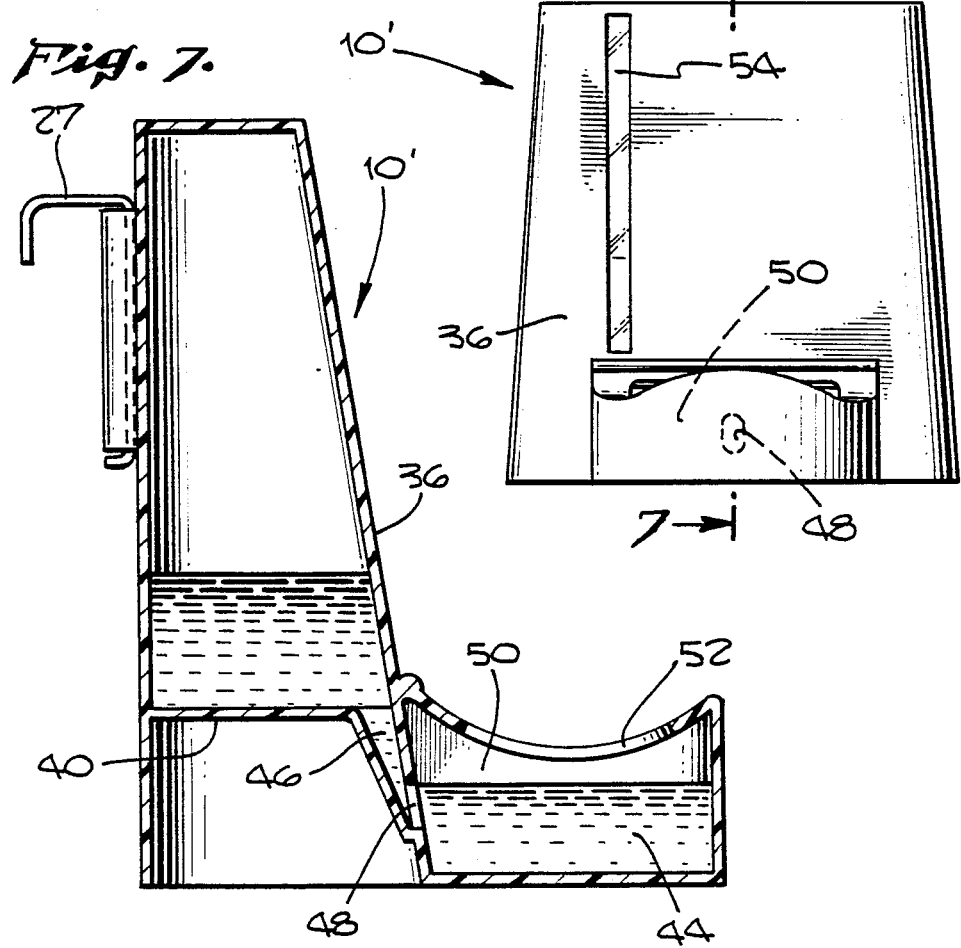

SPLASH-FREE CONTROLLED ACCESS WATER SUPPLY APPARATUS FOR ANIMALS

The present application is a continuation-in-part of my co-pending prior U.S. patent application Ser. No. 171,786, filed Mar. 22, 1988, now U.S. Pat. No. 4,844,014.

FIELD OF THE INVENTION

This invention relates to a portable water supply apparatus for use by animals and pets; and, more particularly this invention relates to a portable water supply apparatus for animals which includes a paddle wheel used to selectively deliver discrete amounts of water from a water reservoir to an open drinking trough so that an animal may be supplied only that amount of water which it needs as desired.

BACKGROUND OF THE INVENTION

Traditionally, small animals and pets have been supplied with water through use of an open top bowl for containing the water or an open end drinking tube affixed to a bottle container with a resilient closure. Both these methods of water supply delivery have attendant problems of drippage, leakage, environmental debris, and unavoidable back flow of contamination. Open bowls may be jostled and their contents spilled out.

It is clear that traditional methods of watering small animals usually resulted in providing more water to the animal than the animal needed for its particular drinking use.

In the prior art, livestock waterers have been disclosed which were primarily directed to a method for keeping the water supply warm during freezing cold temperatures; see P. Paulsen, U.S. Pat. No. 1,326,778. Limited access water supplies have been disclosed in U.S. Pat. No. 4,559,905 to Ahrens and U.S. Pat. No. 3,771,496 to Atchley. In the Ahrens patent, a buoyant spherical float was used as a valve to allow access by livestock to the watering tank only when the animal pushed down on the buoyant float. No particular discrete limit as to the amount of liquid was provided. Atchley discloses the use of a movable control ball at the end of a long tube connected to an inverted bottle water supply for use by hamsters and the like. Again, there is no particular control of the quantity of water supplied when a small animal demands delivery.

SUMMARY OF THE INVENTION

What is needed is a water supply apparatus for small animals and pets which not only provides a limited amount of water on demand to an animal, but also provides only discrete amounts of water to the drinking trough even when the animal demands delivery of water. In this manner, environmental debris, waste, and spillage can be kept to a minimum.

Therefore, the invention disclosed herein is directed to a water supply apparatus for animals which comprises a vertically extending elevated water tank, having at least one open end for communicating with a water trough region. Access to the water tank for filling, for example, may be obtained through a defined aperture accessible through a removable stopper. The water trough zone, which is connected to the water tank through a fluid channel, is generally horizontally disposed and formed as an enclosed container. The water trough is a flat pan-shaped container which is accessible through a substantially rectangular slot formed in a surface defined at the top of a small reservoir associated with the trough. Seated within this slot is a paddle wheel rotatably mounted on a spindle extending longitudinally across the length of the rectangular slot. The paddle wheel substantially closes off the slot but allows fluid communication between the local reservoir and the open drinking trough area when an animal approaches the paddle wheel with its tongue, rotating the paddle wheel and delivering the water to the open drinking trough area. The paddle wheel acts as a means for selectively delivering discrete amounts of water from the local reservoir to the trough.

As the paddle wheel turns, only discrete amounts of water are delivered to the drinking trough area. The paddle wheel may include a plurality of radially extending fins which extend outward from the central spindle rotatably mounted within the rectangular slot of the water reservoir. An outer shroud may contain and enclose the entire water tank and reservoir area forming a neat and streamlined encasement for surrounding the water supply apparatus. The outer shroud is integral with a flat support base which extends along the bottom of the apparatus.

A resilient friction surface may be affixed to the underside of the flat support base to prevent sliding of the water supply apparatus. A support hook may be affixed to the back of the outer shroud so that the entire apparatus may be secured to and supported at the side wall of an animal cage.

A further embodiment of the present invention is directed to a splash-free water supply apparatus for animals which comprises a vertically extending water tank having an opening at one end for communicating with a water reservoir region and having a bottom wall which defines a water tank filler aperture accessible through a removable stopper or closure. The water tank opening is located at a lower elevation than the bottom wall's filler aperture. Hence, when the apparatus is inverted and the stopper removed to allow filling of the water tank, the tank may be completely filled without any water escaping through the opening. The water tank may also include a vertically extending transparent wall section for monitoring the level of water in the water tank when the tank is in its normal upright configuration.

This alternative embodiment includes a water trough area associated with the water reservoir and located at the upper portion of the water reservoir. The water trough area may be surrounded by an overhanging-lip portion which defines access to the water trough area and prevents splash-back of water when an animal uses the water supply apparatus.

The water tank provides a pressure gradient whereby a controlled amount of water is delivered through the water tank opening to the water reservoir and drinking trough area. The water tank extends to a height substantially above the top of the drinking trough area and the water tank's opening is located at an elevation below that of the drinking trough area, thereby continuously regulating the level of the water in the water reservoir so as to substantially fill the drinking trough area associated with the water reservoir without overflowing it.

As previously discussed, a resilient friction surface may be affixed to the underside of the apparatus to prevent it from sliding, and a support hook or hooks may be affixed to the apparatus so it can be secured to and supported by a side wall of an animal cage.

These and other objects of the invention will become apparent in the following description of the drawings and detailed description of the preferred embodiment.

BRIEF DESCRIPTION OF THE DRAWINGS

FIG. 5 is a top plan view of an alternative embodiment of the water supply apparatus of the present invention;

FIG. 6 is a front elevational view of the water supply apparatus of FIG. 5 taken along line 6—6 of FIG. 5;

FIG. 7 is a cross-sectional view of the water supply apparatus taken along line 7—7 of FIG. 6; and FIG. 8 is a partial cross-sectional view of the water supply apparatus taken along line 8—8 of FIG. 5.

DETAILED DESCRIPTION OF THE PREFERRED EMBODIMENT

Figure 1:
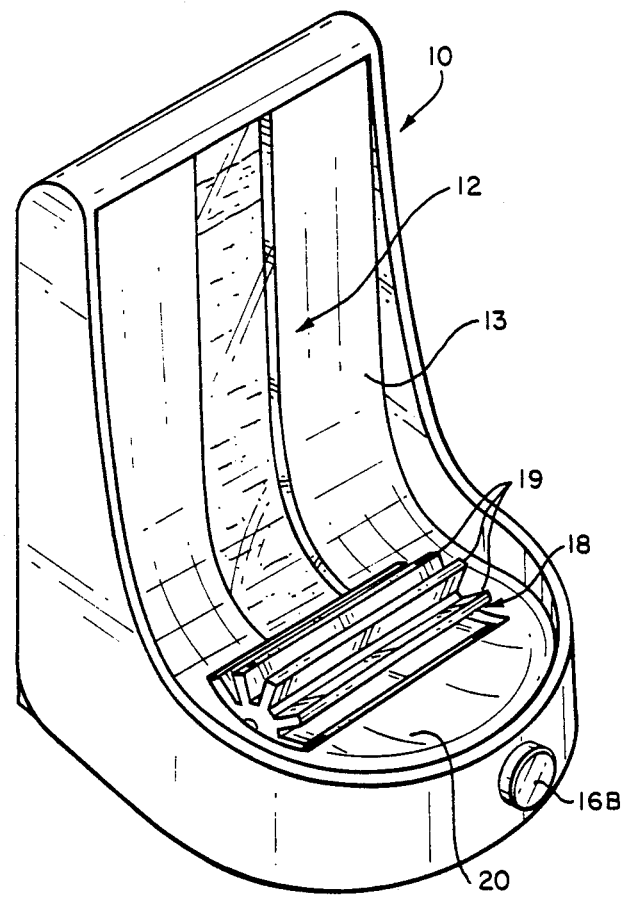
FIG. 1 is a perspective view of a water supply apparatus for animals illustrating the principles of the invention.
Figure 2:
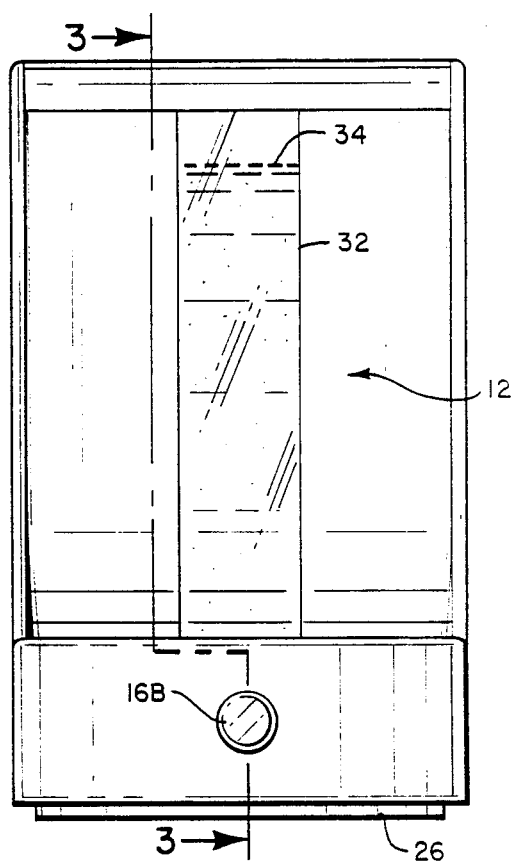
FIG. 2 is a front elevational view of the water supply apparatus of FIG. 1.

With reference to FIGS. 1 through 4, a water supply apparatus for small animals and pets is shown generally at 10. The water supply apparatus of this invention provides a means for selectively delivering discrete amounts of water from a local water reservoir 22 out to the drinking trough area 20. The water supply apparatus 10 has an outer shroud 12 which provides an outer wall and covering for the water supply apparatus 10. The outer shroud 12 is integrally fixed to a base plate 24. The base plate 24 may be supported by a friction surface pad 26. In the preferred embodiment the friction surface pad 26 is a neoprene pad. The under surface of the base plate 24 is desirably covered by a material such as the neoprene pad 26, so that the water supply apparatus 10 does not easily slide or tip over either by accident or when an animal comes to the trough area 20 to drink.

The water supply apparatus 10 operates by providing an enclosed storage area for water within the confines of the outer shroud 12. This enclosed area includes a vertically extending water tank 14, which in the preferred embodiment may be blow-molded. Access to the water storage area for supplying water may be through a removable stopper 16B at the forward end of the apparatus 10, or a removable stopper 16A located at the bottom of the water tank 14. If a removable stopper such as 16A is utilized, it is desirable that the base have a central opening or notch 28 located at the center of the rear of the unit, in order to allow access to the removable stopper 16A, without impairing the stability of the unit. In this manner, water may be introduced to the water tank 14 and water reservoir 22 by means of a removable stopper positioned either at 16A or 16B or at both locations, as desired.

The water tank 14, by being vertically extended, contains enough water for an extended period of time. It is coupled to the local reservoir 22 through the flow channel 23 allowing the water from tank 14 to fill the local water reservoir 22. The water reservoir 22 is an enclosed compartment.

Figure 3:
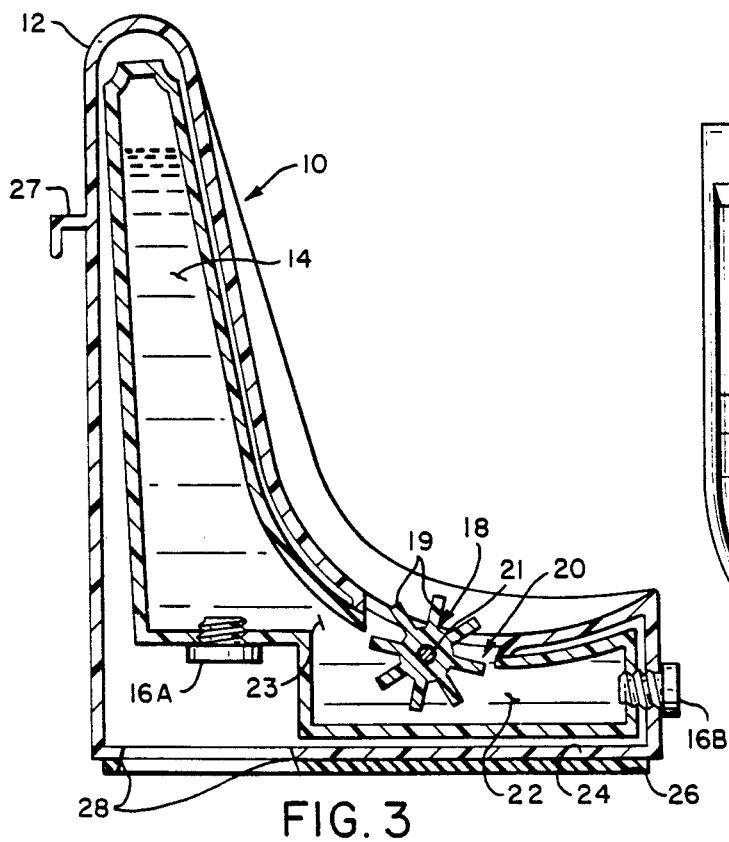
FIG. 3 is a cross-sectional view of the water supply apparatus as shown at FIG. 2 taken along line 3—3.

In the preferred embodiment the water reservoir 22 defines a compartment which is substantially rectangular in shape with an upper curved surface including a rectangular slot 17. The rectangular slot 17 provides access through the top of the containment area defining the local water reservoir 22 for the drinking trough area 20. Longitudinally extended across the entire length of the slot 17 is a spindle 21 which is rotatably mounted at either end for supporting a paddle wheel 18. In the preferred embodiment, the paddle wheel 18 has a plurality of individual fins 19. As shown at FIG. 3, when no animal approaches the water supply apparatus 10, the paddle wheel 18 may be positioned so that a pair of opposing fins 19 effectively seal access between the trough 20 and the water reservoir 22.

In operation, when a small animal or pet approaches the water trough 20 in order to drink, the animal may use its tongue to cause the paddle wheel 18 to rotate. As the paddle wheel 18 rotates, it draws water from the reservoir 20 up and out to the trough 20 surface. Limited discrete quantities of water are delivered by the paddle wheel 18 to the upper trough 20 for purposes of animal drinking. When the paddle wheel 18 is no longer turned, no additional water is brought to the trough 20.

Therefore, according to the foregoing manner, only discrete portions of water are provided to the animal. These portions of water are not determined by any suction or sucking or direct drinking action of the animal; rather, unlike the prior art, the paddle wheel 18 provides a means of limited amounts of water being brought for use of a pet through other than a suction method. This is an important advantage, because then the drinking process for the pet can be a two-step operation. The pet can first activate the paddle wheel 18 with its tongue, and then follow by drinking the water that is then drawn to the surface of the trough 20. Prior art designs (which require that the animal suck on a tube having a valve) allow a direct contact between the animals mouth and any stored water during the drinking process. The invention disclosed herein is directed to an apparatus for delivering discrete amounts of water with less opportunity for environmental contamination.

A small sub-trough is present immediately in front of the paddle wheel. Excess water in the main trough will tend to flow back to the sub-trough level, and the animal will start drinking either at the sub-trough area or using the water between the fins of the paddle wheel.

Figure 4:
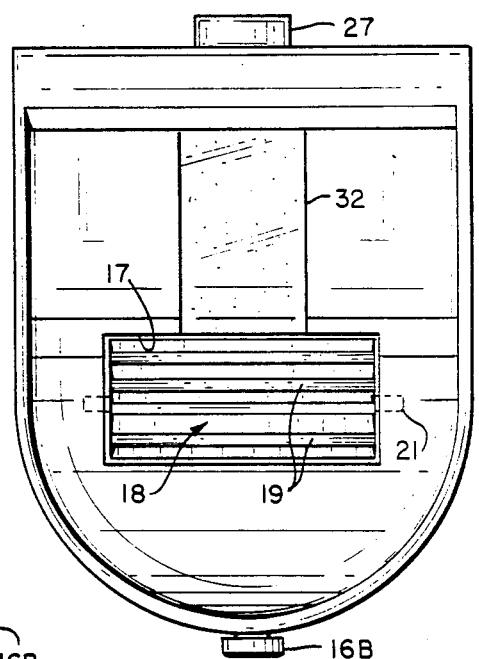
FIG. 4 is a top plan view of the water supply apparatus of FIG. 1.

A supplemental feature, shown in FIGS. 3 and 4, provides for the option of a support hook 27 or bracket which may be used to hang or secure the water supply apparatus 10 on the side wall of an animal cage. The unit may also be provided with a transparent or translucent zone 32 through which the water level 34 may be observed.

One working model of the invention intended for use by cats or small dogs was about 9 inches tall, and 5 or 6 inches wide, with the paddle wheel being about 3 inches in length and approximately one and three-eighths in diameter. Other dimensions could be used for supplying bigger or smaller animals.

Referring now to FIGS. 5 through 8, an alternative embodiment of the present invention is disclosed. A water supply apparatus for small animals 10' provides a vertically extending water tank 36. As is best seen in FIG. 8, access to water tank 36 for supplying water is through filler aperture 38 in bottom wall 40 of water tank 36. Filler aperture 38 is normally sealed with a removable stopper or closure 42 which is removed during the filling process.

Water tank 36, by being vertically extended, may contain enough water for an extended period of time.

As is best seen in FIG. 7, water from water tank 36 enters water reservoir region 44 by flowing down fluid channel 46 and through opening 48. Note that opening 48 is at a lower elevation than filler aperture 38. Hence, during the water tank filling process, when apparatus 10' is necessarily inverted, water tank 36 may be completely filled without any water leaking from or escaping through opening 48.

A water trough area 50 is associated with water reservoir region 44 and located immediately above it. Water trough area 50 may be surrounded by an overhanging-lip portion 52 which both defines access to water trough area 50 and acts to prevent splash-back from water reservoir 44 when an animal uses water supply apparatus 10'.

In operation, water tank 36, after having water added through filler aperture 38, provides a pressure gradient whereby a controlled amount of water is delivered through opening 48 to water tank reservoir 44 and drinking trough area 50. Water tank 36 extends to a height substantially above the top of drinking trough area 50. Also, opening 48 is located at an elevation below that of drinking trough area 50. This configuration, in conjunction with the water tank's pressure gradient, operates to continuously regulate the level of water in drinking trough area 50 so as to substantially fill drinking trough area 50 without overflowing it.

As previously discussed, additional features such as a support hook 27 and resilient friction bottom pad 26 may be employed on water supply apparatus 10'. Also, the unit may be provided with a transparent wall panel 54 in water tank 36 for monitoring the water level in the tank.

While a preferred embodiment of this invention has been disclosed herein, the applicant recognizes that alternative embodiments which function equivalently to the disclosed preferred embodiments are also possible. For this reason, it is requested that the following claims be construed to cover the invention disclosed herein as well as alternative equivalent embodiments.

What is claimed is:

1. A splash-free, portable water supply apparatus for animals comprising:
   a vertically extending water tank having an opening at one end for communicating with a water reservoir region;
   said water tank being sealed at the top and having a bottom wall which defines a filler aperture accessible through a removable closure;
   said apparatus including a drinking trough area having a local water reservoir region associated therewith;
   said water tank providing a pressure gradient by which controlled amounts of water are delivered to said water reservoir and said drinking trough;
   said water tank extending to a height substantially above the top of said drinking trough area, and said opening being located at an elevation below the top of said drinking trough area, whereby the height of the water in said trough area is continuously regulated to substantially fill said trough area without overflowing; and
   all of the water in said tank being in direct communication with said local reservoir through said opening, with no obstructions or moving parts therebetween.

2. The water supply apparatus for animals of claim 1, wherein:
   said water tank includes a vertically extending, transparent wall section whereby the water level in said water tank may be monitored.

3. The water supply apparatus for animals of claim 1, wherein:
   a support hook is affixed to said water tank whereby said apparatus may be supported by a side wall of an animal enclosure.

4. The water supply apparatus for animals of claim 1, wherein:
   said opening in said water tank is at a lower level than said filler aperture.

5. The water supply apparatus for animals of claim 1, wherein:
   said drinking trough area includes an overhanging-lip portion defining access to said drinking trough area and preventing splash-back of water from said drinking trough area during use of said apparatus.

6. The water supply apparatus for animals of claim 5, wherein:
   said opening in said water tank is at a lower level than said filler aperture.

7. The water supply apparatus for animals of claim 1, wherein:
   a resilient friction surface is affixed to the underside of said apparatus.

8. The water supply apparatus for animals of claim 7, wherein:
   said friction surface is a neoprene pad which prevents said apparatus from sliding.

9. A splash-free, portable water supply apparatus for animals comprising:
   a vertically extending water tank being sealed at the top and having an opening at its lower end for communicating with a water reservoir region;
   said water tank having a bottom wall which defines a filler aperture accessible through a removable closure;
   said apparatus including a drinking trough area having said water reservoir region associated therewith;
   said water tank extending to a height substantially above the top of said drinking trough area, and said opening being located at an elevation below the top of said drinking trough area, whereby the height of the water in said trough area is continuously regulated to substantially fill said trough area;
   said opening in said water tank being located at an elevation below that of said filler aperture; and
   all of the water in said tank being in direct communication with said local reservoir through said opening, with no obstructions or moving parts therebetween.

10. The water supply apparatus for animals of claim 9, wherein:
    said water tank includes a vertically extending, transparent wall section whereby the water level in said water tank may be monitored.

11. The water supply apparatus for animals of claim 10, wherein:
    said drinking trough area includes an overhanding-lip portion defining access to said drinking trough area and preventing splash-back of water from said drinking trough area during use of said apparatus.

12. The water supply apparatus for animals of claim 9, wherein:
    said drinking trough area includes an overhanding-lip portion defining access to said drinking trough area and preventing splash-back of water from said drinking trough area during use of said apparatus.

13. A splash-free, portable water supply apparatus for animals comprising:

a vertically extending water tank being sealed at the top and having an opening at one end for communicating with a water reservoir region;

said water tank including a substantially vertically extending transparent wall section for monitoring the water level in said water tank;

said water tank having a bottom wall defining a filler aperture accessible through a removable closure, said filler aperture being located at an elevation higher than said water tank opening;

said apparatus including a drinking trough area having a local water reservoir region associated therewith;

said drinking trough area including an overhanding-lip portion defining access to said drinking trough area and preventing splash-back of water during use of said apparatus;

said water tank providing a pressure gradient by which controlled amounts of water are delivered to said water reservoir and said drinking trough;

said water tank extending to a height substantially above the top of said drinking trough area, and said opening being located at an elevation below the top of said drinking trough area, whereby the height of the water in said trough area is continuously regulated to substantially fill said trough area; and all of the water in said tank being in direct communication with said local reservoir through said opening, with no obstructions or moving parts therebetween.

* * * * *